United States Patent Office 3,577,406
Patented May 4, 1971

---

3,577,406
PROCESS FOR PREPARING THE ANTIBIOTIC STREPTOZOTOCIN
Edward J. Hessler, Kalamazoo, Mich., assignor to The Upjohn Company, Kalamazoo, Mich.
No Drawing. Filed May 23, 1968, Ser. No. 731,615
Int. Cl. C07c 95/04
U.S. Cl. 260—211
6 Claims

ABSTRACT OF THE DISCLOSURE

A chemical process for preparing the antibiotic streptozotocin starting with D-glucosamine which is reacted with N-methylisocyanate to produce N-(methylcarbamcyl)-D-glucosamine, and then reacting this latter compound with a nitrosating agent to produce streptozotocin. Streptozotocin is disclosed in U.S. Patent 3,027,300 as useful for veterinary purposes because of its high activity against *Pasteurella multocida* and *Salmonella pullorum*.

BRIEF SUMMARY OF THE INVENTION

Streptozotocin, a useful antibiotic, was initially produced in a fermentation using the microorganism *Streptomyces achromogenes*. The fermentation process and recovery for preparing streptozotocin is described in Examples 1-4 of U.S. Patent 3,027,300. Subsequent to this patent, the structure of streptozotocin was elucidated and total chemical synthesis reported. See R. R. Herr, H. K. Jahnke, and A. D. Argoudelis, J. Am. Chem. Soc. 89, 4808 (1967). In this reported chemical synthesis of streptozotocin, tetra - O - acetylglucosamine hydrochloride is treated with methyl isocyanate to give a compound having an empirical formula $C_{16}H_{24}N_2O_{10}$, a melting point 142–144° C., and $[\alpha]_D^{25}$ +18° (c. 0.9, 95% ethanol). Treatment of this compound with nitrosyl chloride in pyridine afforded tetraacetylstreptozotocin. Ammonolysis of this compound afforded streptozotocin. As is readily apparent, this reported process is rather complex. And, in fact, an overall yield of only 4% of streptozotocin was obtained following the procedure of the reported process. Because of this low yield of streptozotocin, and the large number of steps required, the reported chemical process was economically not feasible when compared to the frementation process for obtaining streptozotocin.

The process of the subject invention is an improved chemical synthesis of streptozotocin; it is now the preferred process for preparing streptozotocin. The subject process requires two chemical steps and gives streptozotocin in an overall yield of about 55–70% from D-glucosamine.

The first step of the synthesis of streptozotocin comprises reacting D-glucosamine with N-methylisocyanate to produce N - (methylcarbamoyl) - D-glucosamine. The second step comprises reacting N-(methylcarbamoyl)-D-glucosamine with a nitrosating agent to produce streptozotocin. The process can be shown as follows:

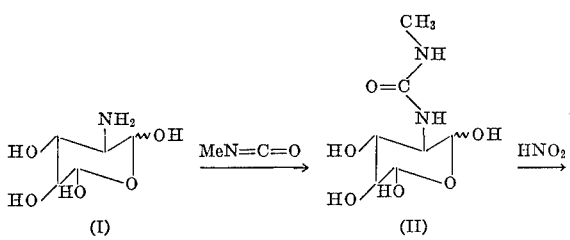

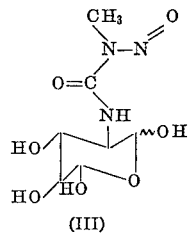

DETAILS OF THE INVENTION

Upon reacting D-glucosamine (1) with N-methylisocyanate for about 30 minutes at a temperature of about −5° C., there is obtained N-(methylcarbamoyl)-D-glucosamine (II). The reaction can be carried on for a longer period than 30 minutes without markedly affecting the desired product. However, there is no advantge in extending the time of the reaction beyond 30 minutes.

In general, the temperature of the reaction can be varied, advantageously, between about −5° C. to about 25° C. A recation temperature below −7° C. results in freezing of the reaction mixture and, thus, the reaction is less efficient. As the reaction temperature is varied upward between −5° C. and 25° C., the time of the reaction will decrease. At any rate, the time of the reaction at 25° C. as well as at −5° C. should be for about 30 minutes to insure a completion of the reaction.

Any D-glucosamine salt, for example, D-glucosamine hydrochloride, can be used in the process. However, the salt first should be converted to D-glucosamine free base. This can be accomplished by the method of R. Breuer, Chem., 31, 2193 (1898), or by percolation of an aqueous solution of D-glucosamine hydrochloride through an anion exchange resin in the hydroxyl form, for example, IRA–68 supplied by Rohm & Haas, Washington Square, Philadelphia 5, Pa.

The second step of the subject process comprises reatcing N - (methylcarbamoyl)-D-glucosamine (II) with a nitrosating agent to produce streptozotocin (III). Advantageously, this step is carried out by aqueous nitrosation of compound II. For example, upon reacting N-(methylcarbamoyl) - D - glucosamine (II) with sodium nitrite and dilute sulfuric acid at −5° C. for about 30 minutes there is obtained streptozotocin (III). Any inorganic nitrite salt and any organic or inorganic acid can be used to generate nitrous acid in situ, or externally from the reaction, as follows:

$$H^+X^- + M^+NO_2^- \rightleftharpoons HNO_2 + M^+X^-$$

wherein $H^+$ is a hydrogen ion; $X^-$ is an anion, for example, $Cl^-$, $SO_4^{--}$, $HiCOO^-$, and the like; and $M^+$ is a metal or a cation, for example, $Na^+$, $Ca^{++}$, $K^+$, $Pb^{++}$, $NH^+$, and the like.

The streptozotocin (III) in the above reaction mixture where the nitrous acid is generated in situ can be recovered by first adding methanol to precipitate sodium sulfate, removing the sodium sulfate by filtration, concentrating the remaining solution to a dry residue, then treating the dry residue with methanol to give crystals of streptozotocin (III).

The second step of the subject process also can be carried out by reacting N-(methylcarbamoyl)-D-glucosamine (II) with a nitrous acid solution prepared, for example, by bubbling dinitrogen trioxide into water maintained at 0° C. for about 10 minutes. This nitrosating method may be especially suitable for large scale reactions since the isolation of streptozotocin (III) from the reaction mixture is relatively trouble free. The isolation comprises concentrating the reaction mixture to dryness, then treating the dry residue with methanol to give crystals of streptozotocin (III). A nitrous acid solution prepared externally from the subject process reaction, by the reaction of an inorganic nitrite salt with an organic or inorganic acid, also can be used as the nitrosating agent.

The time and temperature of the second step of the subject process can be varied as disclosed above for the first step.

The following examples are illustrative of the process of the present invention but are not to be construed as limiting.

EXAMPLE 1

*Preparation of D-glucosamine free base (I)*

200 g. of D-glucosamine hydrochloride is slurried for 20 hours with 140 ml. diethylamine and 2 liters of absolute ethanol. The solid is collected by filtration and rinsed with 100 ml. of absolute ethanol. The solid is then added to 1 liter of absolute ethanol and 70 ml. of diethylamine and reslurried for 20 hours. After filtration, washing, and drying, the solid [158 g., 95% yield of pure D-glucosamine free base (I)] gives a negative chloride ion test. This material is stored at −10° C. and is stable over several months.

EXAMPLE 2

*Preparation of N-(methylcarbamoyl)-Dglucosamine(II)*

A solution of D-glucosamine, (179 mg., 1.0 mmole), prepared as above, in 0.80 ml. of water and 0.50 ml. of ethyl ether is cooled to −5° C. Redistilled N-methylisocyanate (62λ, 60 mg., 1.05 mmole) is quickly added and the solution stirred at −5° C. Aliquots (100λ each) are removed at 15, 30, and 45 minute intervals and lyophilized. After 60 minutes reaction time, the remainder of the reaction mixture is lyophilized. Vapor phase chromatography (VPC) of the aliquots after standard silylation treatment [1] shows that D-glucosamine is completely consumed within 30 minutes and that the yield of compound II is 93%.

EXAMPLE 3

*Synthesis of Streptozotocin (III)*

A solution of D-glucosamine (3.58 g., 20 mmole), prepared as described above, in 16.0 ml. of water and 8.0 ml. of ethyl ether is cooled to −5° C. Redistilled N-methylisocyanate (1.24 ml., 1.20 g., 21 mmole) is added and the mixture is stirred for 30 minutes at −5° C. Sodium nitrite (1.36 g., 19.8 mmole) is added and the mixture stirred until the salt is dissolved. This solution is added dropwise to dilute sulfuric acid (9.80 ml. of 2.00 N) and maintained at −5° C. with stirring over about 30 minutes. After another 30 minutes stirring, 160 ml. of cold methanol is added, causing precipitation of sodium sulfate. The sodium sulfate is removed by filtration and the filtrate is concentrated to dryness at room temperature. The residue is slurried with 10 ml. of methanol to give yellow crystals of streptozotocin; yield, 3.565 g., 68% recovery from D-glucosamine. The remaining filtrate is concentrated to dryness and reslurried with 15 ml. of ethanol to give a second crop of yellow crystals of less pure streptozotocin; yield 680 mg., 12.8% recovery from D-glucosamine.

EXAMPLE

*Synthesis of streptozotocin (III)*

A solution of D-glucosamine (1.79 g., 10.0 mmole) in 8.0 ml. of water and 4.0 ml. of ethyl ether is cooled to −5° C. Redistilled N-methylisocyanate (0.62 ml., 0.60

[1] The silylation treatment is as follows: 10 mg. of test sample, 1.0 ml. dry pyridine, 0.2 ml. hexamethyldisilizane, and 0.1 ml. trimethylsilylchloride are shaken one hour at room temperature. See C. C. Sweeley, R. Bentley, M. Makita, and W. W. Wells, J. Am Chem Soc., 85, 2497 (1963).

g., 10.0 mmole) is added and the mixture is stirred for 30 minutes at −5° C. to produce a solution containing N-(methylcarbamoyl)-D-glucosamine (II).

Dinitrogen trioxide is bubbled into 50 ml. of water kept at 0° C. for about 10 minutes. 1 ml. of this solution is assayed for nitrous acid content. This nitrous acid solution assays about 18.1–18.3 mg. nitrous acid/ml.

The solution of N-(methylcarbamoyl)-D-glucosamine (II), obtained above, is added dropwise over about 30 minutes to 26.1 ml. of the nitrous acid solution (26.1 × 18/47=10.0 mmole nitrous acid), obtained above, at 0° C. This solution is stirred an additional 30 minutes at 0° C. and then concentrated to dryness at room temperature. The residue is slurried with 15 ml. methanol for about 2 hrs. to give yellow crystals of streptozotocin (III); yield, 1.46 g., 55% recovery from D-glucosamine.

EXAMPLE 5

Upon substituting the sodium nitrite and sulfuric acid in Example 3 with an aqueous solution of nitrous acid prepared by the reaction of any inorganic nitrite salt with an organic or inorganic acid, there is obtained streptozotocin.

I claim:

1. A process for preparing the antibiotic streptozotocin which comprises (1) reacting D-glucosamine with N-methylisocyanate to produce N-(methylcarbamoyl)-D-glucosamine, and (2) nitrosating N-(methylcarbamoyl)-D-glucosamine to produce streptozotocin.

2. A process for preparing the antibiotic streptozotocin, according to claim 1, wherein N-(methylcarbamoyl)-D-glucosamine is reacted with aqueous nitrous acid generated in situ by the reaction of an organic or inorganic acid with an inorganic nitrite salt to produce streptozotocin.

3. A process for preparing the antibiotic streptozotocin, according to claim 1, wherein N-(methylcarbamoyl)-D-glucosamine is reacted with an aqueous solution of nitrous acid to produce streptozotocin.

4. A process for preparing the antibiotic streptozotocin which comprises (1) reacting D-glucosamine with N-methylisocyanate to produce N-(methylcarbamoyl)-D-glucosamine, and (2) nitrosating N-(methylcarbamoyl)-D-glucosamine with an aqueous solution of nitrous acid consisting of water into which dinitrogen trioxide is bubbled, to produce streptozotocin.

5. A process for preparing the antibiotic streptozotocin which comprises (1) reacting D-glucosamine with N-methisocyanate to produce N-(methylcarbamoyl)-D-glucosamine, and (2) nitrosating N-(methylcarbamoyl)-D-glucosamine with nitrous acid, generated in situ by the reaction of sodium nitrite with sulfuric acid, to produce streptozotocin.

6. A process for preparing the antibiotic streptozotocin, according to claim 1, which comprises (1) reacting D-glucosamine with methylisocyanate to produce N-(methylcarbamoyl)-D-glucosamine, and (2) nitrosating N-(methylcarbamoyl)-D-glucosamine with an aqueous solution of nitrous acid to produce streptozotocin.

References Cited

UNITED STATES PATENTS 3,158,598  11/1964  Morel _____ 260—211

OTHER REFERENCES

Pigman: "The Carbohydrates," 1957, p. 460, Academic Press Inc., New York, N.Y.

LEWIS GOTTS, Primary Examiner

J. R. BROWN, Assistant Examiner

UNITED STATES PATENT OFFICE
CERTIFICATE OF CORRECTION

Patent No. 3,577,406     Dated May 4, 1971

Inventor(s) Edward J. Hessler

It is certified that error appears in the above-identified patent and that said Letters Patent are hereby corrected as shown below:

Column 1, lines 15-16, for "methylcarbamcyl" read -- methylcarbamoyl --; line 48, for "frementation" read -- fermentation --. Column 2, line 21, for "recation" read -- reaction --; line 32, for "Chem., 31," read -- Chem. Ber., 31, --; lines 37-38, for "reatcing" read -- reacting --; line 51, for "HiCOO-," read -- HCOO-, --; line 53, for "NH+," read -- $NH_4^+$, --. Column 3, line 61, for "Example" read -- Example 4 --. Column 4, line 1, for "10.0" read -- 10.5 --; line 66, for "460" read -- 450 --.

Signed and sealed this 26th day of October 1971.

(SEAL)
Attest:

EDWARD M. FLETCHER, JR.
Attesting Officer

ROBERT GOTTSCHALK
Acting Commissioner of Patents